United States Patent [19]

Face

[11] 4,186,279
[45] Jan. 29, 1980

[54] STORED PROGRAM TELEPHONE DIALER

[75] Inventor: William W. Face, Saline, Mich.

[73] Assignee: Microelectronic Communications Corporation, Madison Heights, Mich.

[21] Appl. No.: 891,212

[22] Filed: Mar. 29, 1978

[51] Int. Cl.² ............................................. H04M 1/45
[52] U.S. Cl. ............................ 179/90 B; 179/90 BD
[58] Field of Search ........... 179/90 B, 90 BD, 90 BB, 179/90 AD; 235/92 TE; 340/147 A, 147 R

[56] References Cited

U.S. PATENT DOCUMENTS

| | | | |
|---|---|---|---|
| 2,995,726 | 8/1961 | Rickard | 340/147 A |
| 3,531,599 | 9/1970 | Bodie | 179/90 BD |
| 3,681,535 | 8/1972 | De Meulenaere | 179/90 B |
| 3,903,376 | 9/1975 | Nishikiori | 179/90 B |

FOREIGN PATENT DOCUMENTS

| | | | |
|---|---|---|---|
| 1219547 | 1/1971 | United Kingdom | 179/90 B |
| 1442887 | 7/1976 | United Kingdom | 179/90 B |

Primary Examiner—Gerald Brigance
Attorney, Agent, or Firm—Krass & Young

[57] ABSTRACT

A device for use with a telephone transceiver to automatically generate any one of N stored dialing codes employs N digital phone number storage registers, and a set of N/2 pushbuttons. A display panel having N display areas on which the stored numbers may be written is supported in sliding relationship with the pushbuttons so that either of two display areas may be moved into operating relationship with each button. Switches controlled by the position of the panel and by the command buttons connect one of the phone number storage registers to a dial signal generator.

5 Claims, 5 Drawing Figures

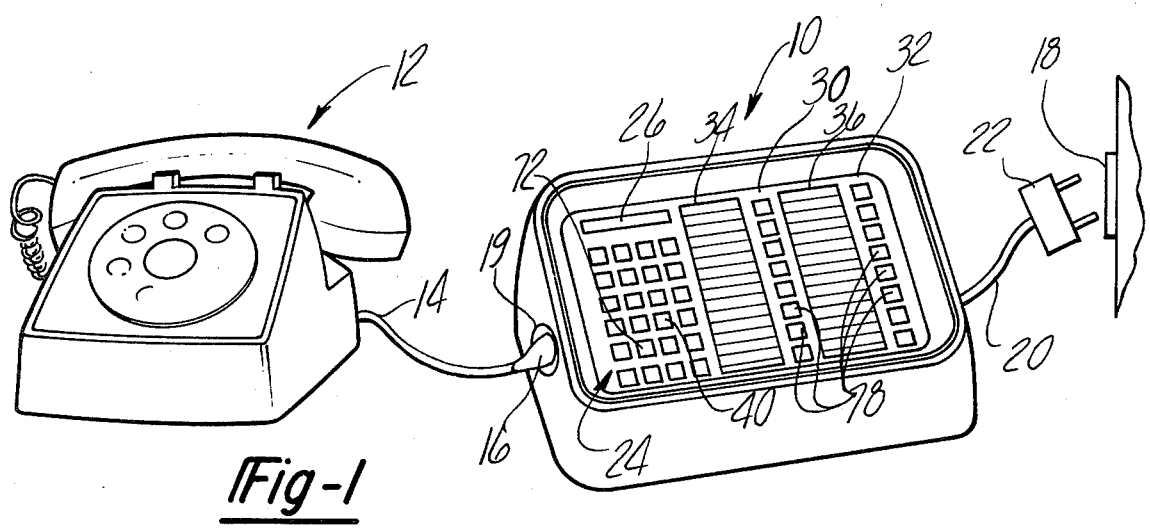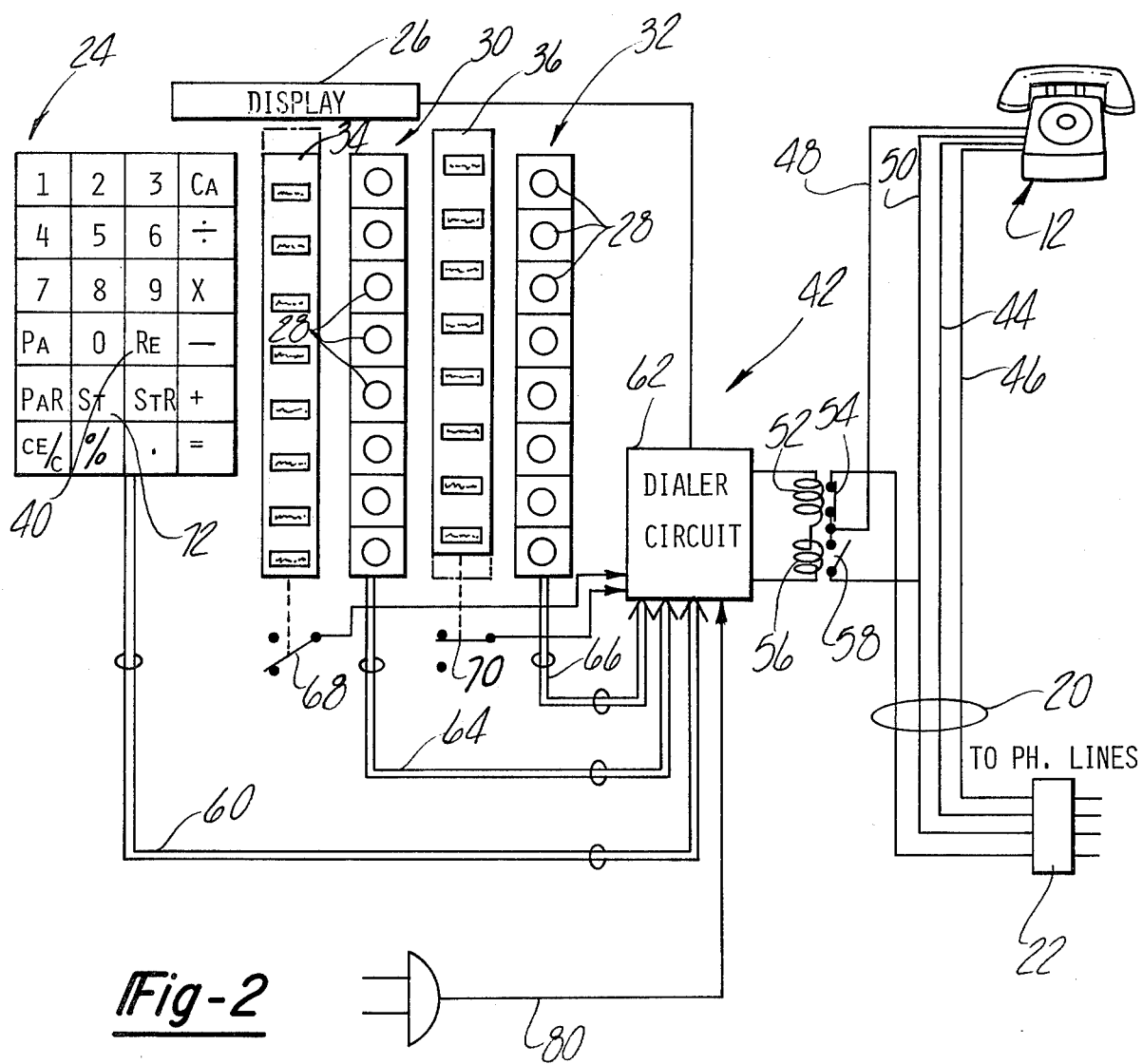

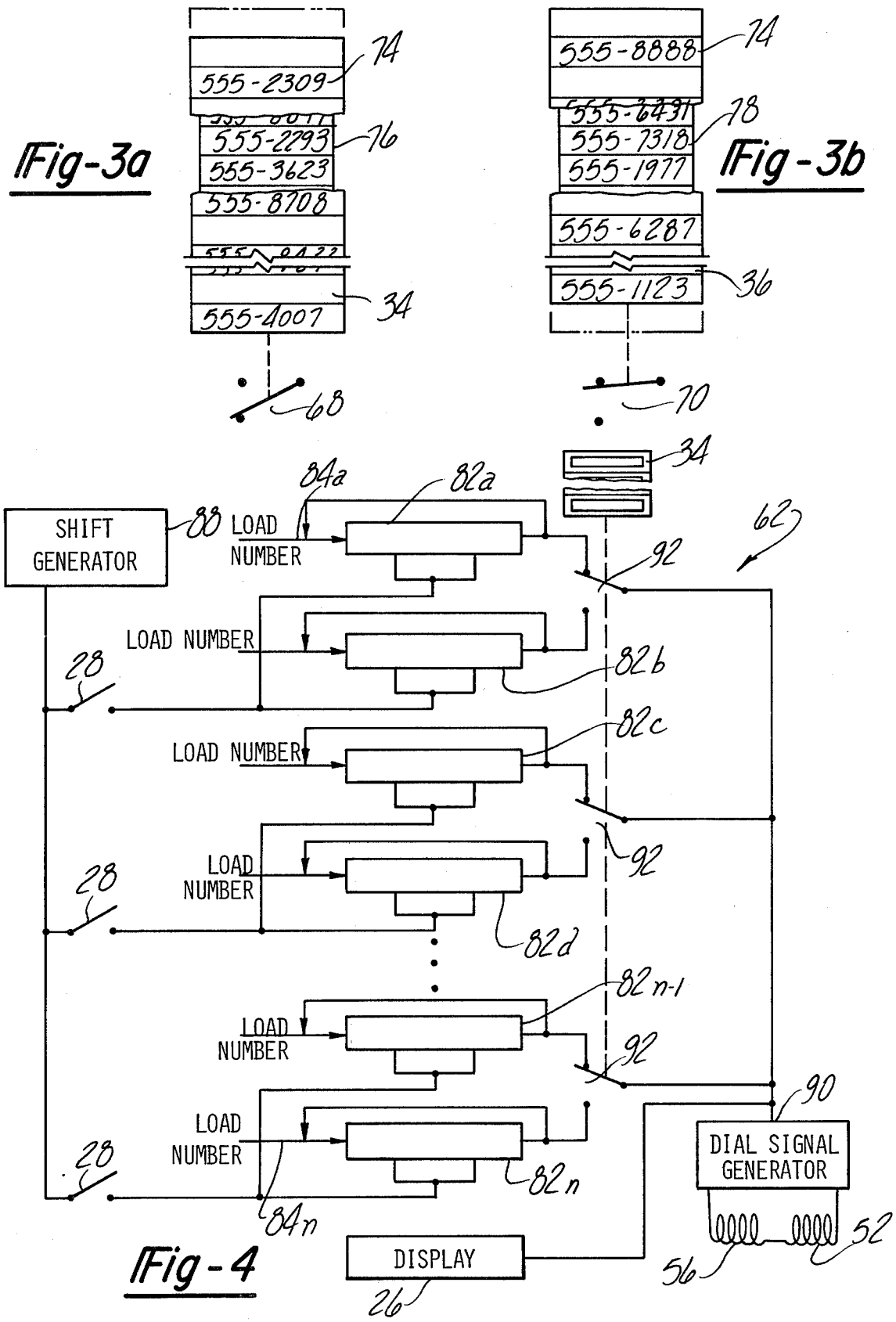

STORED PROGRAM TELEPHONE DIALER

BACKGROUND OF THE INVENTION

1. Field of the Invention

This invention relates to a device for use with a telephone system for generating dialing signals representative of any one of a plurality of telephone numbers stored in digital registers and more particularly, to such a device which employs a plurality of number selection keys which is an integral divisor of the number of telephone numbers that may be stored in the device.

2. Prior Art

For the convenience of telephone users a variety of automatic dialing devices have been developed which allow the user to encode a limited number of frequently employed telephone numbers. When the user wants to dial one of these stored numbers, he simply moves the selector to a position which selects the desired number and then presses a button, or alternatively presses one of a number of buttons, each associated with a different stored telephone number. The device automatically generates the dialing pulses or tones for the encoded number and transmits them over a connected telephone line. The units typically incorporate a keyboard or the like for the use by the operator in storing a number, or altering a previously stored number, as well as a graphic list of the stored numbers, or the names of the parties associated with particular numbers, which are altered when the stored numbers are altered.

Most of these automatic dialing devices fall into one of two types, depending upon whether they store the telephone number codes in magnetic form or digital registers. One type, magnetically coded devices, often employ a magnetic belt, rotatably supported with respect to the device housing so that the operator may move the belt to bring a particular position on the belt, which carries a graphic display of a desired telephone number, into position with a viewing window. This action simultaneously brings a section of the belt which carries a magnetic code for the same telephone number into position with a magnetic reading head. The number viewed through the window may then be dialed by depressing a button which causes the magnetic head to read code signals for the number and provide them to a dial signal generator.

An alternative form of automatic dialer incorporates a number of digital storage registers, each adapted to store the codes for a single telephone number. Each register has a pushbutton connected to it and graphic display areas, each associated with buttons, may be marked with the telephone number encoded in the associated digital register. To dial a particular number the operator merely presses the button next to the graphic display of the desired phone number to provide the contents of the associated register to a dial signal generator.

This digital register type of automatic dialer is mechanically simpler than the magnetic type and is more reliable in operation, but it suffers from the disadvantage of requiring a large number of pushbuttons, one for each phone number stored in the device. The large number of buttons adds to the manufacturing cost of the device and effectively limits the number of phone numbers that may be stored in a device of a given size without so crowding the buttons as to make selection of a particular number difficult.

The present invention is accordingly directed toward a telephone dialer which enjoys the advantages of the digital register type unit, but does not require a single button for each number stored in the machine, allowing the design of a relatively compact, high capacity dialing device.

SUMMARY OF THE INVENTION

The present invention broadly provides a dialer wherein each number to be dialed is digitally stored, either in physically separate registers or in discrete sections of a common digital, random access storage unit. The dialer includes a list device containing separate display areas for each number recorded in the memory. The operator may manually write a phone number on an assigned section of the list at the time he encodes that number into the memory or he may attach a label bearing the number in graphic form, as prepared with a typewriter, for example, on the assigned area of the list.

The device also incorporates one or more pushbuttons that the operator may employ to dial particular numbers encoded in the memory and enscribed on the list, but the number of pushbuttons is less than the telephone number storage capacity of the device and the number of phone display areas on the list. Preferably, the number of buttons is some equal divisor of the phone number capacity of the device: $\frac{1}{2}$, $\frac{1}{3}$, $\frac{1}{4}$, etc.; that is, for each pushbutton there may be 2, 3 or 4 or more numbers stored in the memory and enscribed on the list.

The pushbuttons are supported on the panel of the automatic dialer in an array disposed adjacent to the list device so that each pushbutton is in proximity to a group of 2, 3, 4 or more display areas on the list depending on the ratio of buttons to stored numbers. The pushbuttons and the display support device are arranged so that their association relative to one another may be changed by the operator; in a preferred embodiment of the invention, which will subsequently be disclosed in detail, the buttons are supported in a stationary manner on the housing and a movable memory locator grid, having a number of windows or slots, is supported over the list device. The grid may be moved so as to reveal any one of two or more subsets of phone numbers, written on the list, through the slots in the grid. For example, if the display area contains three sections for each pushbutton, the grid may be moved between three positions to bring any one of those three display sections into operating position. This motion simultaneously brings one of the three numbers associated with each of the other buttons into operating position with respect to that button. Broadly, the numbers on the list are arranged into 2, 3, 4 or more subsets and the grid may be moved relative to the pushbuttons to bring any one of the subsets of numbers on the list into operative position relative to their respective buttons.

Switches operative to sense the position of the display device relative to the pushbutton control the connection of particular number registers to a dialing code generator device. When one of the pushbuttons is depressed, the register containing the phone number written on the display section in operative relationship with that button will be provided to the dial signal generator. Were the display device to be moved to a different position and the same button again depressed, the contents of a different storage register containing the telephone number enscribed on the display section newly moved into operative relationship with that pushbutton would be provided to the dial signal generator. This arrangement allows the storage of a relatively large number of telephone numbers in a relatively small dialer and also decreases the cost of the dialer because fewer pushbuttons are required.

Other objectives, advantages and applications of the present invention will be made apparent by the following detailed description of a preferred embodiment of the invention. The description makes reference to the accompanying drawings in which:

DESCRIPTION OF THE DRAWINGS

FIG. 1 is a perspective view of a stored program telephone dialer representing a first embodiment of the invention, connected to a telephone instrument and to a telephone line outlet jack;

FIG. 2 is a schematic illustration of the circuitry employed in the preferred embodiment of the invention;

FIGS. 3a and 3b are illustrations of the memory address grid employed with the preferred embodiment of the invention and its two positions;

FIG. 4 is a more detailed schematic diagram of the dialer circuits employed in the system of the present invention.

The preferred embodiment of the present invention takes the form of a device, generally indicated at 10, adapted to be used with a conventional telephone transmitter/receiver instrument such as the unit illustrated at 12. The instrument 12 will typically have an electric cord 14 which joins it to telephone lines forming part of a system. The cord 14 may be equipped with a male plug 16 at its end adapted to be connected to telephone circuits through a wall jack 18. When the dialer 10 is employed the plug 16 is simply inserted into a plug 19 formed on the side of the dialer housing and a cord 20 forming part of the dialer, having a male jack 22 disposed on its end, may be inserted into the wall jack 18. If this plug and jack arrangement is not available, other suitable electrical connections may be made between the dialer 10, the telephone transmitter/receiver instrument 12 and the telephone system lines 18.

The preferred embodiment of the phone dialer 10 incorporates a 24 key pushbutton pad, generally indicated at 24; a 12 character alpha-numeric, light emitting diode display section 26; a group of stored phone number selection keys or pushbuttons 28 arranged in two rows, 30 and 32; and a pair of memory address grids 34 and 36. In use, the keyboard 24 is employed to store telephone numbers in the device in register associated with particular number pushbuttons 28. In the preferred embodiment of the invention there are two storage areas assigned to each pushbutton. When a number is stored in a particular area, the operator writes that number in the display area associated with that memory section on an index card supported below one of the grids 34 or 36. The grid 34 is associated with a row of keys 30 while the grid 36 is associated with a row of keys 32.

When the operator desires to dial a particular number, he first lifts the handset from the instrument 12, moves either the grid 34 or 36 into a position so that the number he wants to call is displayed alongside one of the keys 28, and then depresses the key. This causes dial pulses or tones for the stored number to be provided to the telephone line system 18. It also causes the number to be shown on the display 26.

If the operator desires to later redial the same number which was direct dialed from the keyboard before the display has been changed, because it was busy or he wants to again talk to the same party, he simply lifts the telephone handset and depresses the RE button (redial) 40 on the keyboard.

FIG. 2 illustrated the electrical connections between the telephone instrument 12, the circuitry of the dialer 10, generally indicated at 42, and the phone line plug 22. The lines connecting the instrument 12 include a pair of ringing lines 44 and 46 which connect directly from the handset 12 to the outside phone lines, via the plug 22, and a pair of communication lines 48 and 50.

The output of the dialer circuitry comprises a first relay 52, having a pair of normally closed contacts, 54, and a second relay 56, having a pair of normally open contacts, 58. The relays 52 and 56 are preferrably reed relays and their output coils are generally connected in series so that they are simultaneously energized and de-energized. The normally closed contacts 54 of the relay 52 are connected in series with the line 48. The normally open contacts 58 of the relay 56 are connected across the lines 48 and 50. Accordingly, in the absence of the output of a dialing pulse from the circuit 42 the lines 48 and 50 connect directly from the instrument 12 to the phone lines through the plug 22. When a dialing pulse is outputted by the circuit 42 the contact 54 opens, opening line 48 and the contacts 58 close, shunting lines 48 and 50. This momentary situation, created by a short dialing pulse, provides a momentary line interruption in the phone lines and simultaneously short circuits the earphone of the handset 12 to prevent a disturbing clicking which would otherwise be produced through the earphone. The contacts 54 and 58 duplicate a pair of contacts which are contained within the instrument 12 (not shown). The normally open contacts 58 are termed the muting contacts.

In alternative embodiment of the invention, the circuitry 42 could output dial tones rather than dialing pulses.

This manner of electrical connection allows completely normal use of the handset when the device 10 is not outputting dialing pulses. Thus the dial or pushbuttons of the instrument can be employed in the normal manner, particularly to dial numbers that are not called frequently and thus would not normally be stored within the device 10.

Considering now the dialer circuitry 42 which produces the dialing pulses that energize the relays 52 and 56, the keys of the keypad 24 are connected by a cable 60 to a subsystem 62 termed a dialing circuit. The details of this subsystem are disclosed in FIG. 4 and will be subsequently described. Broadly, the dialing circuit 62 receives signals from the keypads which constitute phone numbers for storage and later use, or command signals. The dialer circuit is connected to the display 26 to provide the display with information entered from the keyboard 24 or called up from the memory of the dialer circuit 62 for dialing. Dialing circuit 62 also receives dialing commands from the pushbuttons 28. The row of keys 30 are connected to the dialing circuits 62 by a cable 64 while the row of keys 32 are connected to the dialing circuit by cable 66. Finally, the dialer circuit 62 receives the output of a switch 68 which is controlled by the position of the memory address grid 34, as well as the output of a second switch 70 that signals the position of the memory address grid 36. To store a telephone number in the dialer circuit, first the button 72 of the keypad 24 is depressed, providing a signal to the dialer circuit indicating that the next number is to be stored. Then one of the keys 28 associated with the position with which the number is to be stored is depressed. Previously the memory grid 34 or 36 associated with that key will have been moved to either its upper or lower position. The grids 34 and 36 are slidingly supported with respect to the housing of the device 10 for vertical motion (in a direction parallel to the extension of the list) between two positions which are spaced from one another by one half the distance between a pair of memory keys 28.

This motion allows the provision of means for storing twice as many telephone numbers in the device as there are memory keys 28. Each key is associated with two different numbers and the number that is stored, or recalled from storage for dialing, upon depressing a particular button 28, depends upon whether the memory grid associated with that key is in its upper or lower position.

As illustrated in FIGS. 3a and 3b, each memory address grid 34 and 36 takes the form of a plate having a number of slots 74 equal to the number of keys 28 in one of the rows 30 or 32. The slots 74 are spaced at the same distance relative to one another as are the keys. The motion of the plates 34 and 36 between their lower position (illustrated in FIG. 3a), and their upper position (indicated by the position of the plate 36 in FIG. 3b), is equal to one half the distance between the keys. A phone number list card 76 is supported beneath the grid 34 and a similar card 78 is supported beneath the grid 36.

The cards 76 and 78 each contain a number of positions equal to twice the number of slots 74 in their associated grid. The spacing of the positions on the cards relative to one another is half the spacing between the slots 74 or the keys 28. Accordingly, with the grid 34 in one position, alternate numbers on the list card will be visible through the slot 74 and when the grid is moved to its other position, the intermediate numbers will be visible. In the situation in which there are eight keys 28 in a row 30 or 32 and accordingly, eight slots 74 on the grids 34 and 36, there will be 16 numbers on each of the lists 76 or 78. Considering the phone numbers on a list to be sequentially numbered beginning at the top entry, when the associated grid is in its upper position, the odd numbers will be visible through the slot 74 and with the grid in its lower position the even numbered positions will be visible.

When a telephone number is entered into a particular position in the system through use of the keypad 24, that number is written or typed in an appropriate position on one of the lists 76 or 78. When a telephone number is to be either entered into or recalled for dialing purposes from one of the memory locations within the dialer circuit 62, the guide 34 or 36 associated with the key 28 for that location is first moved into its proper position and the key is then depressed.

The dialer circuit 62 may be powered by either batteries or from power line via line cord 80.

The dialer circuit 62 may be formed of discrete digital components along with selected integrated circuits or it may alternately take the form of a suitably programmed microcomputer. The choice is largely an economic one.

The sections of the dialer circuitry relevant to the present invention are illustrated in greater detail in FIG. 4. FIG. 4 may be considered either a diagram of a discrete component version of the system or the equivalent circuit of a microcomputer based system.

As illustrated in FIG. 4 the dialer circuit includes a plurality of recirculating digital registers 82a, 82b, 82c, 82d . . . 82n. One register 82 is provided for each telephone number that may be stored within the dialer. Each register 82 can store up to 12 binary coded decimal numbers. The numbers are loaded into the registers on lines 84a, 84b, 84c . . . 84n from appropriate dialer circuits controlled by the keypad 24 (not shown). These circuits may be of the conventional type employed in other well-known dialer storage circuits. The registers 82 are arranged in pairs, and the shift circuits of each pair may be connected to a shift signal generator 88 by one of the number keys 28 which actuate normally open switches. Accordingly, when a particular key 28 is depressed, the signals from the shift register are provided to the shift sections of a pair of registers 82: those two registers which are associated with that key on the panel of dialer 10. Shift generator 88 provides a series of 12 pulses which consecutively shift out the contents of the two registers 82 to which it is provided. One member of each set of two registers is connected to a dial signal generator 90 by means of single pole double throw switches 92. One set of switches is provided for each pair of recirculating registers. The switches 92 are controlled by one of the switches 68 or 70, based on the position of the memory locator grid 34, 36 associated with that switch. Accordingly, the switches 80 and 92 select which of the two numbers being shifted on a pair of registers 82, under control of closed switch 28, is provided to the dial signal generator.

The dial signal generator receives a series of up to 12 binary coded decimal signals and uses them to generate a series of dialing pulses which energize the relay coils 52 and 56. Each binary coded decimal number causes the generation of the number of pulses which it encodes.

The binary coded decimal numbers are also provided to display 26 where an appropriate decoder causes the digits to be generated.

In this manner the dialer can store twice as many telephone numbers as there are pushbutton keys 28 and the operator can control the particular number to be generated when a key is depressed.

The embodiments of the invention in which an exclusive property or privilege is claimed are defined as follows:

1. A device adapted to be connected to a telephone line in association with a telephone transceiver to generate any one of a plurality of telephone station addressing signals, comprising:
   a station addressing signal generator;
   a plurality of alterable digital registers, each adapted to store an entire station address code;
   a number index containing a plurality of discrete areas each associated with one of said registers and being adapted to display a station address, the display areas being arrayed in linear relation to one another;
   a memory locator grid containing a plurality of windows equal in number to a divisor of the number of display areas on the index, the grid being slidably supported for movement relative to the index, along the linear axis of the display areas, between a number of positions equal to said divisor; and
   switch means supported relative to the index and the grid operative to control the interconnection of the signal generator with one of said registers which is associated with one of the areas on the index forming a member of the subset in operative relation with the grid, whereby the address signal generated by the device is a function of the relative position of the index and the grid.

2. The device of claim 1 wherein the index is formed on a flat sheet, the grid comprises a plate having a plurality of slots formed there, and the grid is supported over the index so that a subset of display areas on the index are visible through the slots on the grid.

3. The device of claim 1 wherein said subsets of areas on the index each contain an equal number of areas and said switch means comprises a plurality of keys equal in number to the number of areas in one of said subsets of areas on the index.

4. The device of claim 3 wherein said pushbuttons are supported in linear relationship to one another, parallel to the display areas on the index, and are spaced from one another by a distance equal to the distance between a pair of display areas on the index multiplied by the number of subsets of areas contained on the index.

5. The device of claim 4 wherein the number of keys and the number of slots on the grid is equal to one-half the number of registers and areas on the index.

* * * * *